US 009830627B2

(12) United States Patent
Clark

(10) Patent No.: US 9,830,627 B2
(45) Date of Patent: Nov. 28, 2017

(54) CUSTOMIZED ELECTRONIC GIFT PRODUCT AND ASSOCIATED METHODS

(71) Applicant: Jim Clark, Suwanee, GA (US)

(72) Inventor: Jim Clark, Suwanee, GA (US)

(*) Notice: Subject to any disclaimer, the term of this patent is extended or adjusted under 35 U.S.C. 154(b) by 793 days.

(21) Appl. No.: 13/907,871

(22) Filed: Jun. 1, 2013

(65) Prior Publication Data
US 2014/0358717 A1 Dec. 4, 2014

(51) Int. Cl.
G06Q 30/00 (2012.01)
G06Q 30/06 (2012.01)
G06Q 40/00 (2012.01)

(52) U.S. Cl.
CPC .................. G06Q 30/0621 (2013.01)

(58) Field of Classification Search
USPC ........................................ 705/26.5
See application file for complete search history.

(56) References Cited

U.S. PATENT DOCUMENTS

| 2007/0011060 A1* | 1/2007 | Karas | G06Q 10/101 |
| | | | 705/14.27 |
| 2008/0103627 A1* | 5/2008 | Torian | G06Q 20/3558 |
| | | | 700/233 |
| 2009/0055296 A1* | 2/2009 | Nelsen | G06Q 20/10 |
| | | | 705/30 |
| 2009/0070258 A1* | 3/2009 | Nguyen | G06Q 20/10 |
| | | | 705/41 |
| 2009/0145969 A1* | 6/2009 | Daley | G06Q 30/02 |
| | | | 235/491 |
| 2009/0171775 A1* | 7/2009 | Cashion, Jr. | G06Q 30/02 |
| | | | 705/14.26 |
| 2009/0192928 A1* | 7/2009 | Abifaker | G06Q 30/02 |
| | | | 705/35 |
| 2010/0017278 A1* | 1/2010 | Wilen | B42D 15/045 |
| | | | 705/14.2 |
| 2011/0047039 A1* | 2/2011 | Crames | G06Q 20/206 |
| | | | 705/18 |
| 2011/0124390 A1* | 5/2011 | Wilen | G06Q 30/02 |
| | | | 463/9 |
| 2011/0153462 A1* | 6/2011 | Granich | G06Q 20/105 |
| | | | 705/27.1 |
| 2011/0210170 A1* | 9/2011 | Arguello | G06F 17/30879 |
| | | | 235/380 |
| 2012/0234911 A1* | 9/2012 | Yankovich | G06Q 30/06 |
| | | | 235/379 |

(Continued)

Primary Examiner — Ashford S Hayles
(74) Attorney, Agent, or Firm — Crose Law LLC; Bradley D. Crose

(57) ABSTRACT

A digital/virtual gift product is provided for generation and customization by a giver through a service provider and for receipt by a recipient for use with a merchant. The digital/virtual gift product includes: a representation of a monetary gift value selected by the giver and depicted on the digital/virtual gift product for use and redemption with a preselected merchant; a merchant identification depicted on the digital/virtual gift product to identify the preselected merchant, selected by the giver, and at which preselected merchant the digital/virtual gift product is redeemable; and a giver identification to identify the giver of the digital/virtual gift product to the recipient and to the merchant. At least one system and associated methods also are disclosed for creating, customizing, and tracking multiple digital/virtual gift products.

11 Claims, 8 Drawing Sheets

(56) References Cited

U.S. PATENT DOCUMENTS

| | | | |
|---|---|---|---|
| 2013/0022284 A1* | 1/2013 | Zheng | G06Q 10/107 382/229 |
| 2013/0080321 A1* | 3/2013 | Mulhall | G06Q 30/02 705/41 |
| 2013/0117181 A1* | 5/2013 | Isaacson | G06Q 20/10 705/41 |
| 2013/0117646 A1* | 5/2013 | Hansen | G06Q 30/0225 715/205 |
| 2013/0144732 A1* | 6/2013 | Rothschild | G06Q 20/0457 705/17 |
| 2013/0254064 A1* | 9/2013 | Stone | G06Q 30/0603 705/26.5 |
| 2013/0297431 A1* | 11/2013 | Deubell | G06Q 20/18 705/17 |
| 2013/0311326 A1* | 11/2013 | Lucas | G06Q 30/06 705/26.8 |
| 2014/0122327 A1* | 5/2014 | Aleles | G06Q 20/381 705/39 |
| 2014/0201292 A1* | 7/2014 | Savage | H04L 51/063 709/206 |

* cited by examiner

CUSTOMIZED ELECTRONIC GIFT PRODUCT AND ASSOCIATED METHODS

FIELD OF THE INVENTION

The technology described herein relates generally to the fields of gift cards, gift products, personal/business networking, advertising, data processing, text messaging, and personal/business messaging. More specifically, this technology relates to a gift product, system, and associated methods for generating and customizing an electronic gift product for delivery in a digital/virtual, mobile, virtual, and/or printed format. Furthermore, this technology relates to a system and associated methods to improve effectiveness and referral generation for business executives, owners, independent contractors, sales representatives, and the like. The system also provides for a "pocket" storage in the user application of individual cards a member has received. The system also engages in data warehousing in order to provide metrics generated via sales, social networking, social psychology, and human habits.

BACKGROUND OF THE INVENTION

Traditional, physical gift cards are known in the background art. By way of example, a gift card is a preloaded debit-type card that allows a cardholder to purchase goods and services and debit the preloaded gift card with the purchase price. The gift card is preloaded for a certain purchase amount selected by the giver of the gift card. A number of gift cards can be used at business locations such as retailers, restaurants, and so forth. Some gift cards can even be used anywhere that accepts major credit cards. Certain gift cards may be reloadable.

By way of example, a traditional, physical gift card is given when a small token of thanks is warranted or when a more thoughtful gift cannot be obtained. However, use of such cards includes many deficiencies and limitations.

BRIEF SUMMARY OF THE INVENTION

In various exemplary embodiments, the technology described herein provides a gift product, system, and associated methods for generating and customizing a personalized, electronic gift product for delivery in a digital/virtual, mobile, and/or printed format to an intended recipient. Furthermore, this technology provides a system and associated methods to improve effectiveness of referral processing and relational development for business executives, owners, independent contractors, sales representatives, and the like.

In one exemplary embodiment, the technology described herein provides a personalized, digital/virtual gift product for generation and customization by a giver through a service provider and for receipt by a recipient for use with a merchant. The digital/virtual gift product includes: a representation of a monetary gift value selected by the giver and depicted on the digital/virtual gift product for use and redemption with a preselected merchant; a merchant identification depicted on the digital/virtual gift product to identify the preselected merchant, selected by the giver, and at which preselected merchant the digital/virtual gift product is redeemable; and a giver identification to identify the giver of the digital/virtual gift product to the recipient and to the merchant.

The digital/virtual gift product is adapted for generation and customization by the giver through the service provider and for receipt by the recipient for use with the preselected merchant.

In at least one embodiment, the service provider that provides the digital/virtual gift product to the giver for delivery to the recipient is not the merchant. In an alternative embodiment, the merchant utilizes the service provider format for use within their system.

In at least one embodiment, the digital/virtual gift product is adapted for use such that the service provider maintains a plurality of data on a relationship between the giver, the recipient, and the digital/virtual gift product. In an alternative embodiment, the merchant maintains such data.

The digital/virtual gift product is adapted for use such that the service provider maintains a plurality of data on a relationship between the merchant, the giver, and the digital/virtual gift product.

The digital/virtual gift product is adapted for use such that the service provider maintains a plurality of data on a relationship between the merchant, the recipient, and the digital/virtual gift product.

In at least one embodiment, the personalized, digital/virtual gift product also includes a customized message provided by the giver to the service provider for depiction within the digital/virtual gift product for personalization of the digital/virtual gift product.

In at least one embodiment, the personalized, digital/virtual gift product further includes a unique identifier, such as a matrix barcode, depicted on the digital/virtual gift product and adapted to provide the recipient additional information on the merchant.

In at least one embodiment, the personalized, digital/virtual gift product also includes a unique identifier, such as a matrix barcode, depicted on the digital/virtual gift product and adapted to provide the recipient additional information on the giver.

In at least one embodiment, the personalized, digital/virtual gift product further includes a textual unique identifier generated by the service provider and adapted to identify the digital/virtual gift product.

In at least one embodiment of the personalized, digital/virtual gift product, the giver identification also includes a photographic image of the giver depicted on the digital/virtual gift product for view by the recipient and the merchant.

In at least one embodiment of the personalized, digital/virtual gift product, the giver identification further includes a name, a title, a phone number, and an e-mail address of the giver for view by the recipient and the merchant.

In at least one embodiment of the personalized, digital/virtual gift product, in the case that the giver is a company or business-type entity, the giver identification further may include the company name, address, phone number, web site address, and logo of the giver for view by the recipient.

In at least one embodiment of the personalized, digital/virtual gift product, the merchant identification also includes a merchant logo representative of the merchant at which merchant the digital/virtual gift product is redeemable.

In at least one embodiment of the personalized, digital/virtual gift product, the merchant identification further includes a merchant name and a merchant location of the merchant at which merchant the digital/virtual gift product is redeemable.

In another exemplary embodiment, the technology described herein provides a method to generate and customize a digital/virtual gift product, for generation and customization by a giver through a service provider and for receipt by a recipient for use with a merchant. The method includes: capturing, by the giver, a name, a mobile telephone number, and an e-mail address for a prospective recipient; accessing, by the giver, a service provider site, of which the giver is a member, through which to add the recipient, or select a previously added recipient, intended to receive the digital/virtual gift product; selecting, by the giver, a merchant through which merchant the digital/virtual gift product is redeemable by the recipient; personalizing, by the giver, the digital/virtual gift product by creating a personal message to the recipient; selecting a monetary gift value amount, by the giver, and depicting the amount on the digital/virtual gift product for use and redemption with the preselected merchant; and forwarding, electronically by the service provider, the giver to a site for the merchant, whereby the giver completes a financial transaction to purchase the digital/virtual gift product; thereby, creating the digital/virtual gift product having the monetary gift value selected by the giver for use and redemption with the preselected merchant.

In at least one embodiment, the method also includes returning the giver, from the merchant site, to the service provider site for an opportunity to conduct additional transactions.

In at least one embodiment, the method further includes: alerting, by the merchant, and upon completion of a valid digital/virtual gift product purchase transaction, the service provider a status of the successful digital/virtual gift product purchase transaction; and providing, by the merchant to the service provider, a card number assigned to the recipient and a confirmation of the monetary gift value amount assigned to the digital/virtual gift product.

In at least one embodiment, the method also includes: capturing by the service provider, the card number assigned to the recipient and the confirmation of the monetary gift value amount assigned to the digital/virtual gift product; and establishing a connection with the recipient.

In at least one embodiment, the method further includes transmitting, by the service provider, the digital/virtual gift product to the recipient on a specified date, either the current date of purchase or a date selected in the future.

In at least one embodiment, the digital/virtual gift product is transmitted by the service provider to the recipient via an e-mail message.

In at least one embodiment, the digital/virtual gift product, once transmitted via the e-mail message, is printed.

In at least one embodiment, the digital/virtual gift product is transmitted by the service provider to the recipient via a text message.

In at least one embodiment, the digital/virtual product is transmitted by the service provider to the recipient via the mobile application installed on the recipient's mobile device.

In at least one embodiment, the digital/virtual product is transmitted by the service provider to the recipient via additional technology mediums, such as, but not limited to devices providing augmented reality and mobile marketing.

In at least one embodiment, the method also includes: formatting a merchant identification to be depicted on the digital/virtual gift product to identify the preselected merchant, selected by the giver, and at which preselected merchant the digital/virtual gift product is redeemable; and depicting the merchant identification on the digital/virtual gift product.

In at least one embodiment, the method also includes: formatting a giver identification to identify the giver of the digital/virtual gift product to the recipient and to the merchant; and depicting the giver identification on the digital/virtual gift product.

In at least one embodiment, the method further includes: providing a service plan, by the service provider, to the giver such that the giver is enabled a prepackaged service plan purchase through which to purchase multiple digital/virtual gift products; and tracking, by the service provider, an inventory of giver transactions through the service provider.

In yet another exemplary embodiment, the technology described herein provides a computer readable storage medium encoded with programming for implementing a method to generate and customize a digital/virtual gift product, for generation and customization by a giver through a service provider and for receipt by a recipient for use with a merchant.

The computer readable storage medium encoded with programming is configured to perform one or more of the following process steps: 1) capture, by the giver, a name, a mobile telephone number, and an e-mail address for a prospective recipient; 2) access, by the giver, a service provider site, of which the giver is a paying member, through which to add the recipient, or select a previously added recipient, intended to receive the digital/virtual gift product; 3) select, by the giver, a merchant through which merchant the digital/virtual gift product is redeemable by the recipient; personalize, by the giver, the digital/virtual gift product by creating a personal message to the recipient; 4) select a monetary gift value amount, by the giver, and depict the amount on the digital/virtual gift product for use and redemption with the preselected merchant; and 5) in some cases, forward, electronically by the service provider, the giver to a site for the merchant, whereby the giver completes a financial transaction to purchase the digital/virtual gift product; thereby, 6) to create the digital/virtual gift product having the monetary gift value selected by the giver for use and redemption with the preselected merchant.

Advantageously, the personalized digital/virtual gift products, systems, and associated methods described herein provide significant benefits to individual participants, such as central registration for networking contacts, turning encounters with customers and referral partners into new business, adds financial value of improved networking contacts and connections, creates a unique business/gift card (the digital/virtual gift product) that leaves a lasting impression upon the recipient, increases the probability of follow-up meetings, and encourages the card givers most highly valued contacts who receive the unique business/gift cards.

Advantageously, the personalized digital/virtual gift products, systems, and associated methods described herein provide significant benefits to merchants such as no-waste advertising cost, no-cost gift card production, costs incurred only when revenues are realized, provides aided card management, obtains data on giver (card buyer) and recipient (card user), and mobile application GPS for aid in locating a particular merchant store location. Additionally, other data points such as personalized behavior by the giver as to buying habits, demographics, socio economic information, and other such information as to be of value to the merchant as this technology becomes more wide spread and acceptable, may be utilized.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
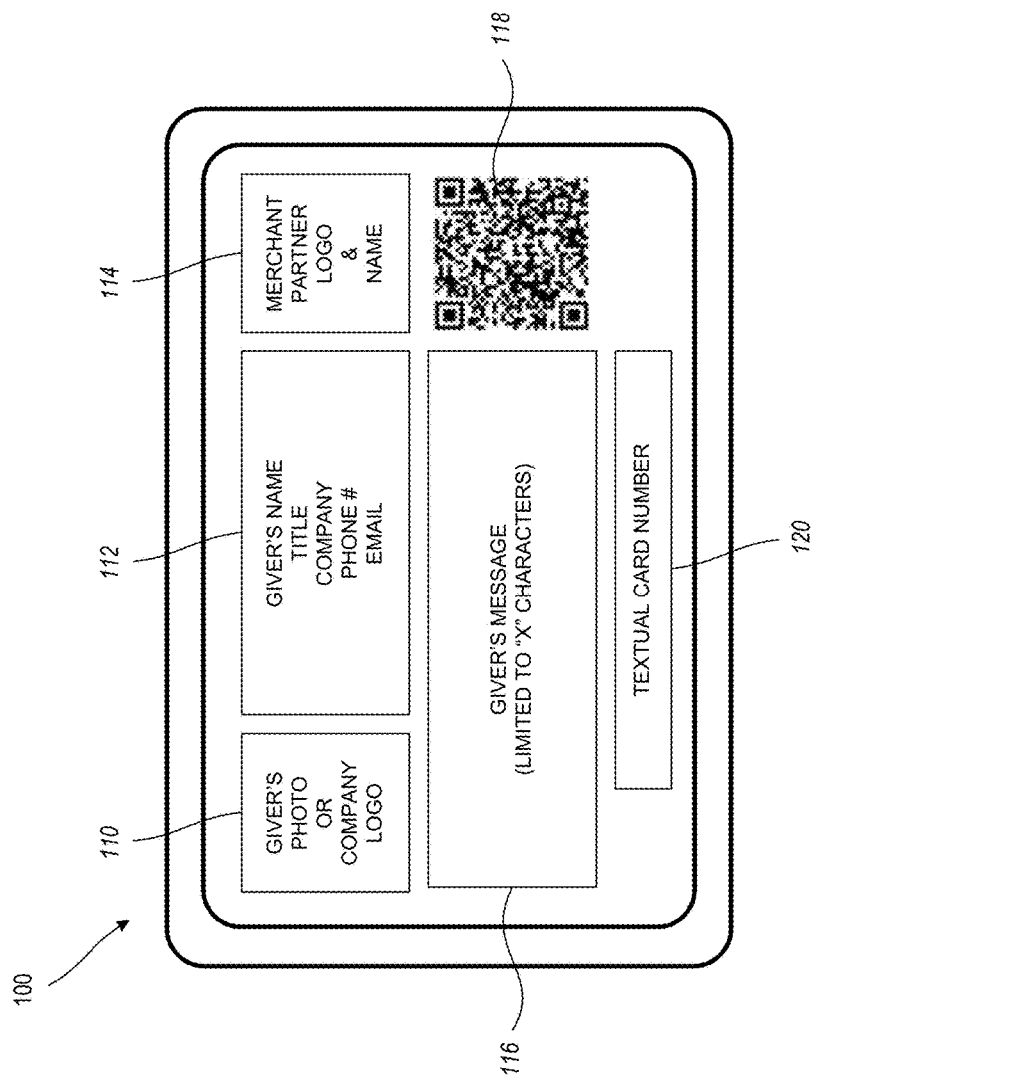
FIG. 1 is a schematic diagram illustrating a generated gift card digital/virtual product for communications to a recipient to enable the recipient to have a gift card and also receive additional information from both the giver and the merchant provider, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a personal, customized gift product 100, a system 700, and associated methods for generating and customizing a personalized, electronic gift product 100 for delivery in a digital/virtual, mobile, and/or printed format to an intended recipient 712. Furthermore, this technology provides a system 700 and associated methods to improve effectiveness and referral processing for sales representatives, networkers, and the like.

A traditional, physical gift card is given when a small token of thanks is warranted or when a more thoughtful gift cannot be obtained. The digital/virtual gift product will define new ways to use a gift card and make the gift card a more meaningful product by adding personal elements to the content. By way of example, the digital/virtual gift product may be used to entice a business prospect to meet by prepaying for a planned meeting at a coffee shop, sandwich shop or other business meeting place. By way of example, the digital/virtual gift product may be used to stay connected to a key customer for such events as promotions, completion of a successful project or order, or simply to send a message appreciating a continued business relationship. For non-business applications, the giver may use the digital/virtual gift product as a personal gift of congratulations, appreciation or to support an individual project. Adding the personal messaging capability will allow the giver to expressly state the purpose and objective in presenting the card to the recipient.

The giver must first have captured the recipient's name, cell phone, email information, and/or social media handle, and other available information which may be useful in the future. The giver will be able to access their contacts from their profile, or they will be able to add a new acquaintance just prior to ordering a digital/virtual gift product. The giver will then visit the service provider's web site by using a PC, mobile device, or the like; using the service provider's mobile application; or using any other device available today or in the future that enables the merchant to connect with the recipient; select a merchant partner for which the digital/virtual gift product will be operational, enter the message they wish to have attached to the digital/virtual gift product, and enter a monetary amount to be made available to the recipient.

The service provider's website, may, in some instances, forward the giver to the respective merchant's website; or process the giver's purchase directly on the service provider's website, mobile application, or other marketing device to complete the financial transaction using their credit card, electronic payment, or other means of payment. When the financial transaction has completed, the giver will be allowed to order additional cards if desired.

After the financial transaction has been completed, the merchant will alert the service provider of the successful payment and registration transaction along with the card number assigned to this recipient for this particular digital/virtual gift product and a confirmation of the amount allocated to the digital/virtual gift product. The service provider will capture the card number and amount and will establish a relationship with the giver's respective contact. The digital/virtual gift product, which will include the merchant identification, amount, giver identification, and giver specified information and message, is then pushed to the recipient with information via text, email, mobile application, voice, video, and other mediums available to the recipient. The notification will be dependent upon the merchant chosen and services purchased by the giver. For those recipients with mobile phone numbers, the digital/virtual gift product will be pushed to the respective mobile phone number, and for those with only email addresses the digital/virtual gift product will be sent via email for printing by the recipient. There may arise, in the future, other mediums available to the client, such as devices providing augmented reality and home data delivery. The digital/virtual gift product and associated notifications will utilize such devices for application platforms and notification mechanisms.

The giver's contact information will be updated with the new digital/virtual gift product number and the amount added. This information is maintained by the service provider for the giver's account indefinitely.

When the recipient is alerted to receiving a digital/virtual gift product, he or she will see the image of the new digital/virtual gift product via the mobile application, website, and other devices. When the digital/virtual gift product is used by the recipient and the digital/virtual gift product's balance is reduced, the merchant will advise the service provider of such transactions and the respective digital/virtual gift product's balance will be updated. This information is maintained by the service provider for the giver's account. A trigger or threshold is also utilized in at least one embodiment. Such trigger or threshold is provided by the giver and will cause an alert to be sent to the giver when the card balance falls below such value to offer the giver the option to reload. This is also provides a management advantage. All business data will be stored for data warehousing and business intelligence, which could be another advantage. In at least one embodiment, an option exists for the giver to set an automated amount without continually rechecking the service, and the alert will only be given to the giver in this instance based on an additional charge required by the giver to maintain that automated amount.

The giver will visit his or her service provider profile from time to time at the service provider website and review balances on cards in his or her account list. The giver can then choose to refresh the card with new funds at that point or at some point in the future.

In practice, use of such digital/virtual gift products with the disclosed system and associated methods, aid to improve effectiveness and referral processing for business executives, owners, independent contractors, sales representatives, networkers, and the like. By way of example, when someone in business meets a new contact and decides there could be value in meeting subsequently with this person to share further information, the offer of a commitment to cover a follow up beverage or meal, for example: 1) Increases the likelihood of a follow up meeting; 2) Increases the likelihood future commerce may transpire; and 3) Establishes a high level of goodwill by the giver which absent the digital/virtual gift product could take an extended period of time.

Use of this digital/virtual gift product, system, and associated methods upgrades the perceived value of a traditional gift card above that of an afterthought or modest intrinsic value to that of uniqueness and significant. The system is beneficial to the giver, recipient, merchant, and service providers in multiple ways.

This digital/virtual gift product and system offers an opportunity for one to stay in contact in a personal way without necessarily having to make a personal appearance. For example, a sales representative may choose to send a thank you message and a gift for a large order, contract renewal, congratulations on a profitable operating period, and so forth, without physical driving to meet with the customer.

The digital/virtual gift product allows the merchant to extend its reach to the giver. Currently, with known traditional gift card systems, the merchant has information on the giver only if the giver purchases the traditional gift card at the merchant web site. Generally, much of the giver information is missing. However, when the giver orders a digital/virtual gift product with the system and associated methods disclosed herein, the service provider and the merchant now have access to the initiator of commerce which offers new marketing opportunities.

The digital/virtual gift product allows the merchant to extend its reach to the recipient. Currently, with known traditional gift card systems, the merchant has information on the recipient only if the recipient chooses to register the traditional gift card at the merchant web site. Generally, much of the recipient information is missing. However, in all cases where the recipient receives, accepts and uses the digital/virtual gift product, the service provider and the merchant now have access to the recipient's market data, such as product purchases, costs of goods sold, visit frequency, and other buying habits and psychology offering new marketing opportunities.

The digital/virtual gift products are digital/virtual products which will minimize the "lost card" financial impacts upon the recipients. The opportunity to replace or provide credit for a "lost card" now exists. Additionally, a digital/virtual gift product is extremely portable (such as a text on a smart phone), take up no physical space (such as a card in a wallet or purse), and are very convenient for use by both giver and merchant.

In one exemplary embodiment, the technology described herein provides a personalized, digital/virtual gift product 100. The digital/virtual gift product 100 is adapted for generation and customization by a giver 702 through a service provider 710 and for receipt by a recipient 712 for use with a merchant 720.

Figure 7:
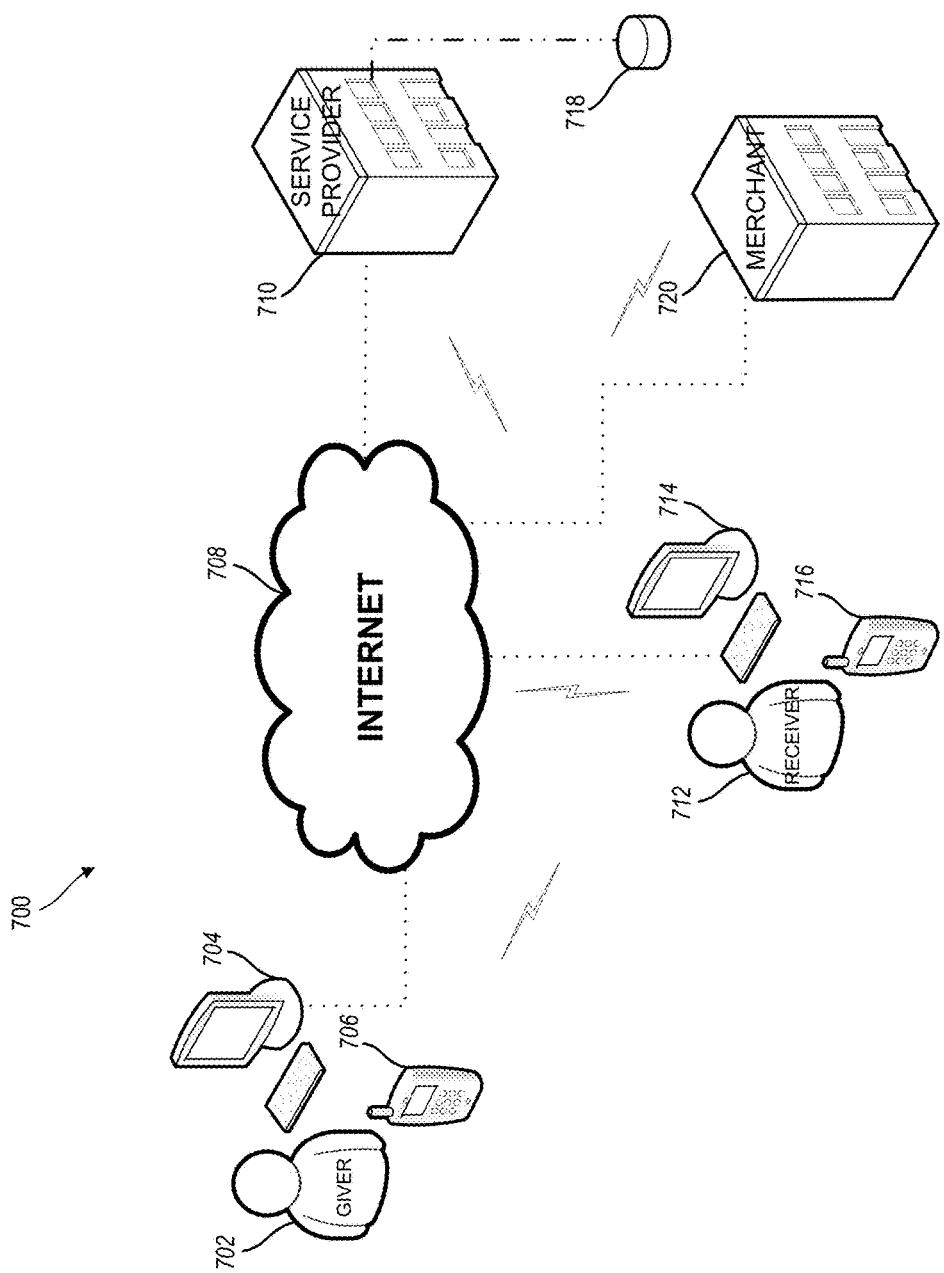
FIG. 7 is a schematic diagram illustrating a system architecture for improving the effectiveness and referral processing for sales representatives and customizing an electronic gift product for delivery in a digital/virtual, mobile, and/or printed format.

By way of example, and as depicted in FIG. 7, the giver 702 may utilize a computer 704, or like device such as a laptop, personal computer, and so forth, or a wireless device 706, such as a tablet, smart phone, personal digital/virtual assistant, and so forth for access through a network 708. The user may also obtain access through networked glass, wrist glass, a GPS device, a smart car, smart house, and the like. The giver 702 accesses a service provider 710 website. The service provider maintains one or more servers, and one or more databases 718, and so forth, to provider this digital/virtual gift product service to a multiplicity of givers 702, who may be members of a service provider membership plan, or the like. The service provider 710 also has access through a network 708. Likewise the merchant also has access through a network 708. The recipient 712 of the digital/virtual gift product 100 may utilize a computer 714, such as a laptop, personal computer, and so forth, or a wireless device 716, such as a tablet, smart phone, personal digital/virtual assistant, and so forth for access through a network 708.

The digital/virtual gift product 100 includes a representation of a monetary gift value, such as for example, $5, $25, $50, $100, $250, and so forth, or alternatively can be redeemable for a predetermined item when the card is given in return for the particular item, selected by the giver 702 and depicted on the digital/virtual gift product 100 for use and redemption with a preselected merchant 720. The value or item may be identified on the digital/virtual gift product 100, scanned such as through a matrix barcode 118 (such as a QR Code®, for example), or the like, or identified within a custom message area with the giver's message 116.

The digital/virtual gift product 100 includes a merchant identification 114 depicted on the digital/virtual gift product 100 to identify the preselected merchant 720. The merchant 720, as referenced by the merchant identification 114 depicted on the digital/virtual gift product 100, is selected by the giver 702. The recipient of the digital/virtual gift product 100 may redeem the gift with the identified merchant 114. The redemption may be in person, online, electronically, or the like. Use of the digital/virtual gift product 100 is not limited as a traditional, physical gift card.

In at least one embodiment of the personalized, digital/virtual gift product 100, the merchant identification also specifically includes a merchant logo 114. The merchant logo is representative of the merchant 720 at which merchant the digital/virtual gift product 100 is redeemable. In at least one embodiment of the personalized, digital/virtual gift product 100, the merchant identification further includes a merchant name and a merchant location specifically of the merchant 720 at which merchant the digital/virtual gift product 100 is redeemable.

The digital/virtual gift product 100 includes giver identification information, such as for example, those depicted in elements 110, 112. The giver identification information 110, 112 is utilized to identify the giver 702 of the digital/virtual gift product 100 to both the recipient 712 and to the merchant 720, and anyone else seeing the printed digital/virtual gift product 100, smart phone app, or the like, in which the giver identification 110, 112 information is visibly displayed.

In at least one embodiment of the personalized, digital/virtual gift product 100, the giver identification information also includes a photographic image 110 of the giver 702 depicted on the digital/virtual gift product 100 for view by the recipient 712 and the merchant 720. In at least one embodiment of the personalized, digital/virtual gift product 100, the giver identification information further includes a name, a title, a phone number, and an e-mail address 112, and the like, of the giver 702 for view by the recipient 712 and the merchant 720. In which cases the giver is a company, company information, such as name, address, phone number, web site and the like, would be used in the place of the giver identification information.

The digital/virtual gift product 100 is adapted for generation and customization by the giver 702 through the service provider 710. The digital/virtual gift product 100 is adapted for receipt by the recipient 712 for subsequent use with the preselected merchant 720 at the recipient's leisure.

In at least one embodiment, the service provider 710 that provides the digital/virtual gift product 100 to the giver 702 for delivery to the recipient 712 is not the merchant 720.

The digital/virtual gift product 100 is adapted for use such that the service provider 710 maintains a plurality of data on a relationship between the giver 702, the recipient 712, and the personalized, digital/virtual gift product 100. This information can be provided to both giver's 702 and merchants 720. The information to the giver 702 is helpful for business development, networking, tracking recipients, tracking gifts and so forth. The information to the merchant 720 is helpful for identifying new business, repeat customers, and so forth, In at least one embodiment, the personalized, digital/virtual gift product 100 also includes a customized message 116. The customized message 116 is provided by the giver 702 to the service provider 710 for depiction on the digital/virtual gift product 100 and to personalize the digital/virtual gift product 100. The customized message 116 can be text, and image, or other item easily communicated electronically with the digital/virtual gift product 100 for receipt by the recipient 712.

In at least one embodiment, the personalized, digital/virtual gift product 100 further includes a matrix barcode 118. The matrix barcode 118 can be depicted on the digital/virtual gift product 100. The matrix barcode 118 is adapted to provide the recipient 712 with additional information about the merchant 720. In at least one embodiment, the personalized, digital/virtual gift product 100 also includes a matrix barcode 118 depicted on the digital/virtual gift product 100 that is adapted to provide the recipient 702 with additional information on the giver 702. In at least one embodiment, the matrix bar code is of the QR Code® type. The giver 702, merchant 720, and/or service provider 712 may provide additional information in the matrix barcode 118 for use by the recipient 712.

In at least one embodiment, the personalized, digital/virtual gift product 100 further includes a textual unique identification number 120 on the card. The unique identification number 120 is generated by the service provider 710 and is adapted to identify the digital/virtual gift product 100 by an alpha-numeric string that is recognizable to both the service provider 710 and merchant 720 at the time of redemption.

In another exemplary embodiment, the technology described herein provides a method 200, 300, 400, 500, 600 to generate and customize a digital/virtual gift product, for generation and customization by a giver through a service provider and for receipt by a recipient for use with a merchant.

Figure 2:
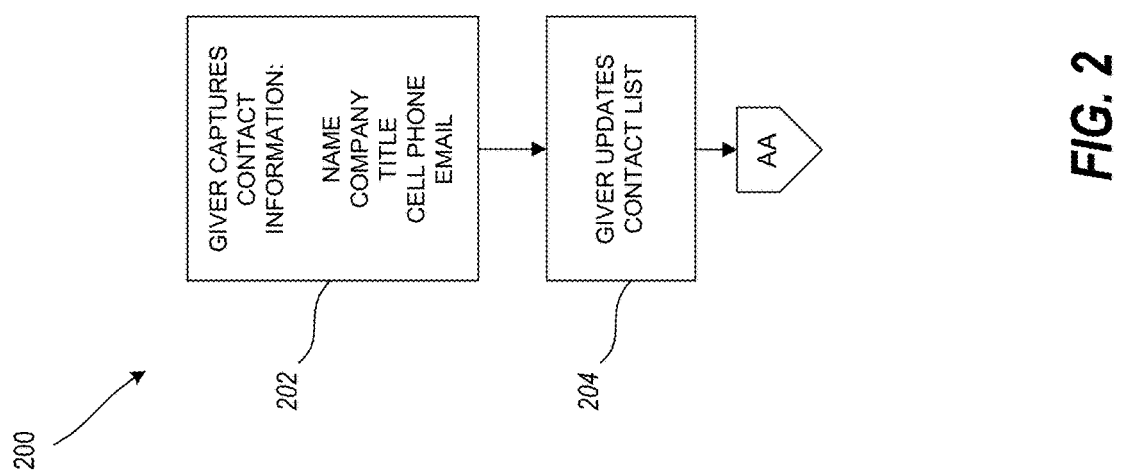
FIG. 2 is a flowchart diagram illustrating method steps for a digital/virtual gift giver capturing contact information and updating contact lists, according to an embodiment of the technology described herein.

As depicted in FIG. 2, the flowchart 200 of the method includes process steps 202 and 204.

At step 202, a giver 702 is capturing a name, a mobile telephone number, and an e-mail address for a prospective recipient. Other contact attributes can be captured as sought by the giver 702 and as utilized by the service provider 710.

At step 204, a giver 702 is updating his or her contacts list. These may be managed, at first on a mobile device, such as within a mobile phone application by the service provider 712, and then later transmitted to the service provider 712 as the giver 702 visits the service provider 712 website or access such through the mobile phone application.

Figure 3:
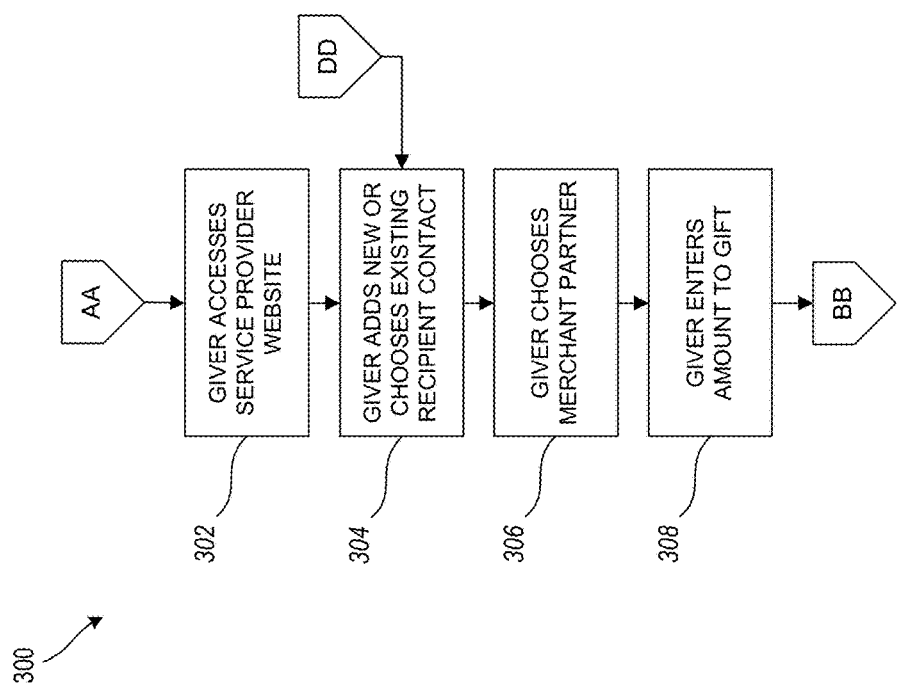
FIG. 3 is a flowchart diagram illustrating method steps for a digital/virtual gift giver accessing a service provider, choosing a recipient, and choosing a merchant partner, according to an embodiment of the technology described herein.

As depicted in FIG. 3, the flowchart 300 of the method includes process steps 302, 304, 306, and 308.

At step 302, the method includes accessing, by the giver 702, a service provider site 710, of which the giver 702 is a member. The member may be a paying member or a non-paying member depending on the membership plan. This may be visiting a website of the service provider 712 or accessing the service provider 712 through a mobile phone application, or the like.

At step 304, the method includes the giver 702 adding a recipient 712, or selecting a previously added recipient 712, intended to receive the digital/virtual gift product 100 as a gift or token of appreciation from the giver 702. This can be a syncing of a contact lists from the giver 702 to the account of the giver 702 located at the service provider 712.

At step 306, the method includes the giver 702 choosing a merchant 720 through which merchant the digital/virtual gift product 100 is redeemable by the recipient 712. The giver 702 may chose a merchant 720 from the list provided at the service provider 712 which includes participating merchants 720.

At step 308, the method includes the giver 702 entering an amount for a digital/virtual gift product 100 which is to be given to the recipient 720. The digital/virtual gift product 100 includes a representation of a monetary gift value, such as for example, $5, $25, $50, $100, $250, and so forth, or alternatively can be redeemable for a predetermined item when the card is given in return for the particular item, selected by the giver 702 and depicted on the digital/virtual gift product 100 for use and redemption with a preselected merchant 720.

Figure 4:
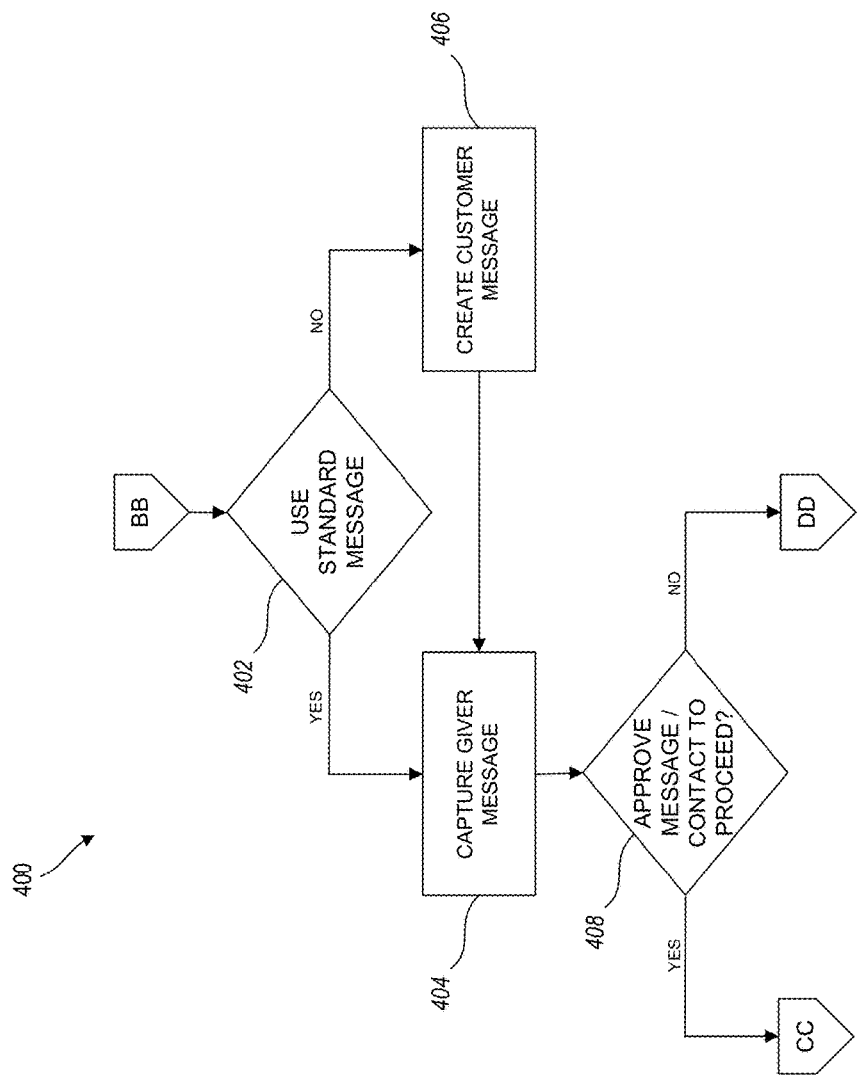
FIG. 4 is a flowchart diagram illustrating method steps for a digital/virtual gift giver choosing a message through the service provider, and having that recipient and message approved by the provider, according to an embodiment of the technology described herein.

As depicted in FIG. 4, the flowchart 400 of the method includes process steps 402, 404, 406, and 408.

At step 402, the method includes selecting by the giver 702, whether a standard message is selected. A message can be depicted on a digital/virtual gift product 100 at message 116.

At step 404, and assuming that the giver 702 did select the standard message, the method includes capturing the giver message. A message can be depicted on a digital/virtual gift product 100 at message 116.

At step 406, and assuming that the giver did not select the standard message, the method includes the giver 702 personalizing the digital/virtual gift product 100 by creating a personal message 116 to the recipient 720.

At step 408, and irrespective of whether the standard message was selected or whether the customized message option was used, the method includes approving the message and/or contact for in order to proceed to continue processing the digital/virtual gift product 100.

Figure 5:
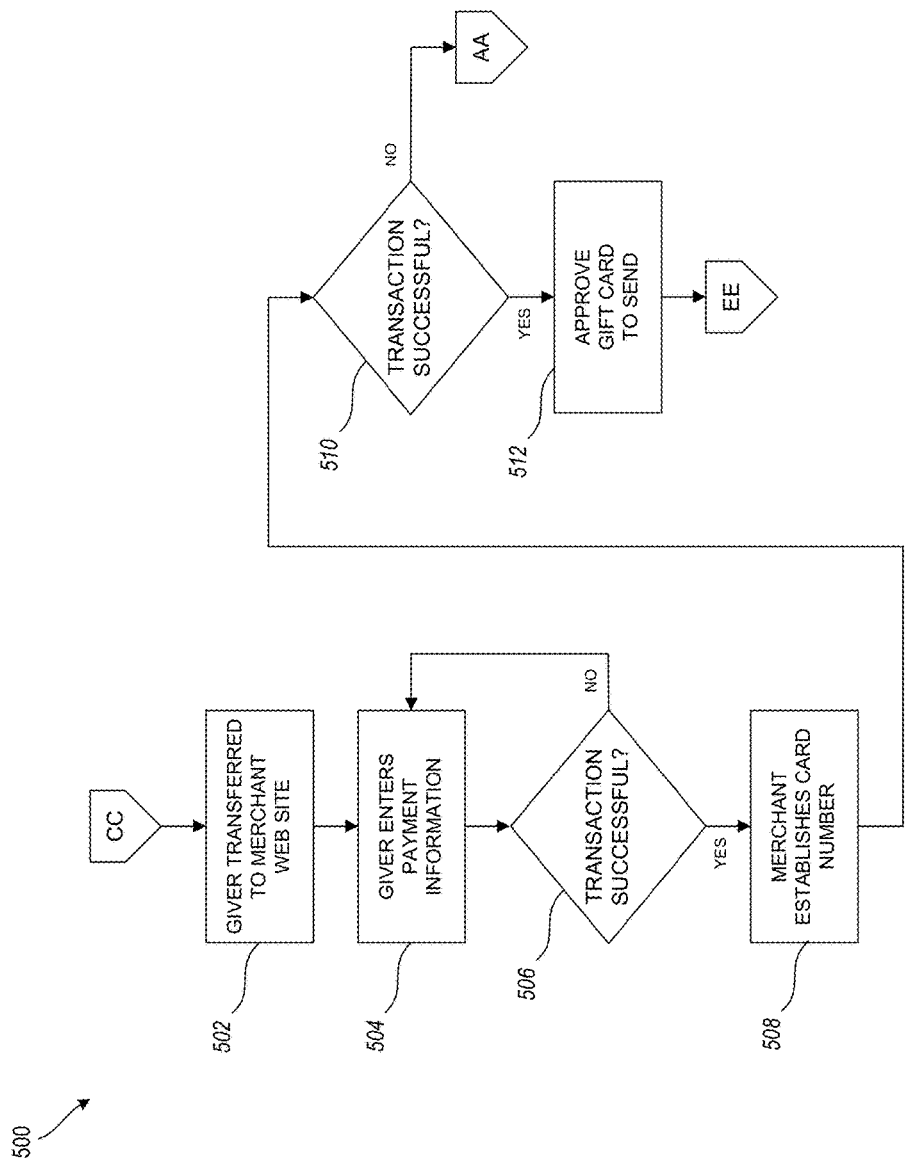
FIG. 5 is a flowchart diagram illustrating method steps for a digital/virtual gift giver accessing a merchant partner website, making payment for the gift to be sent, receiving a merchant card number, and approving the gift card for sending, according to an embodiment of the technology described herein.

As depicted in FIG. 5, the flowchart 500 of the method includes process steps 502, 504, 506, 508, 510, and 512.

At step 502, the method may include transferring, by the service provider 710, the giver 702 to the merchant website.

At step 504, the method includes entering payment information, by the giver 702. Payment information may include, but is not limited to, by way of example, a credit card number and associated data for a payment.

At step 506, the method includes inquiring whether the transaction for payment in step 504 is approved. The giver 702 must provide valid payment information, and that payment information must be validated by the merchant, service, provider, or credit card processing gateway at this step 506 in order to proceed.

At step 508, and upon verifying successful payment information at method step 506, the giver receives a card number 120. The card number will be depicted on the digital/virtual gift product 100 delivered to the recipient 712.

At step 510, the method includes inquiring whether the transaction at step 508 was successful. If the transaction was successful, the method proceeds to step 512. Otherwise, the user must begin the process at an earlier process step.

At step 512, the method includes approved the digital/virtual gift product 100. If approved, the digital/virtual gift product 100 is transmitting to the recipient 712. This step thereby includes, creating the digital/virtual gift product 100 having the monetary gift value selected by the giver 702 for use and redemption with the preselected merchant 720.

Figure 6:
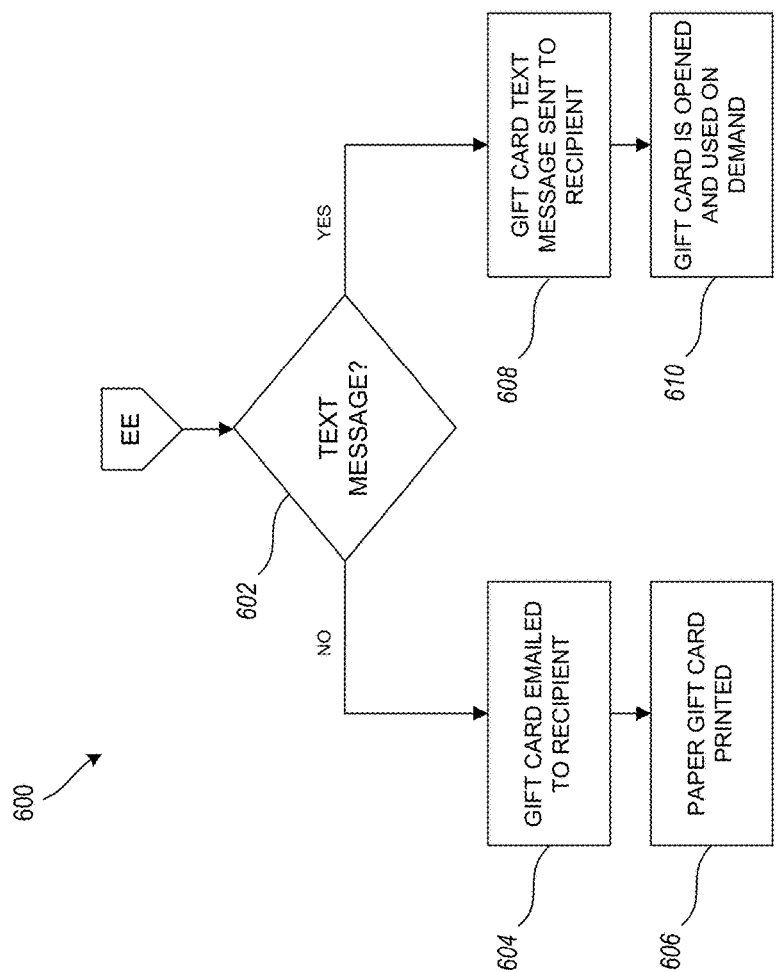
FIG. 6 is a flowchart diagram illustrating method steps for sending the gift card to the recipient, according to an embodiment of the technology described herein.

As depicted in FIG. 6, the flowchart 600 of the method includes process steps 602, 604, 606, 608, 610, and 612.

At step 602, the method includes inquiring whether the giver 702 seeks to send a text message to transmit to the recipient 720.

At step 604, and assuming the giver 702 selected "NO" to the text message inquiry in step 602, the digital/virtual gift product 100 is transmitted to the recipient 712 via email, or text or audio, or video.

At step 606, the recipient, upon receipt of the email (or text or audio, or video) message generated at step 604, prints, or otherwise conveys or transfers, the digital/virtual gift product 100 to the recipient 712 for use with the merchant 720.

At step 608, and assuming the giver 702 selected "YES" to the text message inquiry in step 602, the digital/virtual gift product 100 is transferred to the recipient via text message, or other means, such as an application by which the recipient receives the digital/virtual gift product 100 on a smart phone, digital/virtual/virtual device, or other portable electronic device.

At step 610, the method step includes receiving the digital/virtual gift product 100 by the recipient 712. The recipient may then utilized the digital/virtual gift product 100 on demand at the merchant 720.

In at least one embodiment, the method also includes returning the giver 702, from the merchant site, to the service provider site for an opportunity to conduct additional transactions.

In at least one embodiment, the method further includes: alerting, by the merchant 720, and upon completion of a valid digital/virtual gift product purchase transaction, the service provider 710 a status of the successful digital/virtual gift product purchase transaction; and providing, by the merchant 720 to the service provider 710, a card number 120 assigned to the recipient 712 and a confirmation of the monetary gift value amount assigned to the digital/virtual gift product 100

In at least one embodiment, the method also includes: capturing by the service provider, the card number 120 assigned to the recipient 712 and the confirmation of the monetary gift value amount assigned to the digital/virtual gift product; and establishing a connection with the recipient 712.

In at least one embodiment, the method further includes transmitting, by the service provider, the digital/virtual gift product 100 to the recipient.

In at least one embodiment, the digital/virtual gift product 100 is transmitted by the service provider 710 to the recipient 712 via an e-mail message.

In at least one embodiment, the digital/virtual gift product 100, once transmitted via the e-mail message, is printed.

In at least one embodiment, the digital/virtual gift product 100 is transmitted by the service provider to the recipient via a text message.

In at least one embodiment, the digital/virtual gift product 100 is delivered virtually.

In at least one embodiment, the method also includes: formatting a merchant identification 112, 114 to be depicted on the digital/virtual gift product 100 to identify the preselected merchant 720, selected by the giver 702, and at which preselected merchant 720 the digital/virtual gift product 100 is redeemable; and depicting the merchant identification 112, 114 on the digital/virtual gift product 100.

In at least one embodiment, the method also includes: formatting a giver identification 110, 112 to identify the giver 702 of the digital/virtual gift product 100 to the recipient 712 and to the merchant 720; and depicting the giver identification 110, 112 on the digital/virtual gift product 100.

In at least one embodiment, the method further includes: providing a service plan, by the service provider, to the giver such that the giver 702 is enabled a prepackaged service plan purchase through which to purchase multiple digital/virtual gift products 100; and tracking, by the service provider, an inventory of giver transactions through the service provider 710.

As will be apparent to one of ordinary skill in the art, upon reading this disclosure, some of the above methods steps may be implemented in varying order depending on the given circumstances. Additionally, one or more method steps may be omitted under the appropriate circumstances.

In yet another exemplary embodiment, the technology described herein provides a computer readable storage medium encoded with programming for implementing a method to generate and customize a digital/virtual gift product 100, for generation and customization by a giver 702 through a service provider 710 and for receipt by a recipient 712 for use with a merchant 720.

The computer readable storage medium encoded with programming is configured to perform one or more of the following process steps: 1) capture, by the giver, a name, a mobile telephone number, and an e-mail address (and any other information that is voluntarily given or is derived from other sources such as social media, public records, and the like) for a prospective recipient; 2) access, by the giver, a service provider site, of which the giver is a member (paying or non-paying dependent on the membership), through which to add the recipient, or select a previously added recipient, intended to receive the digital/virtual gift product; 3) select, by the giver, a merchant through which merchant the digital/virtual gift product is redeemable by the recipient; personalize, by the giver, the digital/virtual gift product by creating a personal message to the recipient; 4) select a monetary gift value amount, by the giver, and depict the amount on the digital/virtual gift product for use and redemption with the preselected merchant; and 5) forward, electronically/virtually by the service provider, the giver to a site for the merchant, whereby the giver completes a financial transaction to purchase the digital/virtual gift product; thereby, 6) to create the digital/virtual gift product having the monetary gift value selected by the giver for use and redemption with the preselected merchant.

Figure 8:
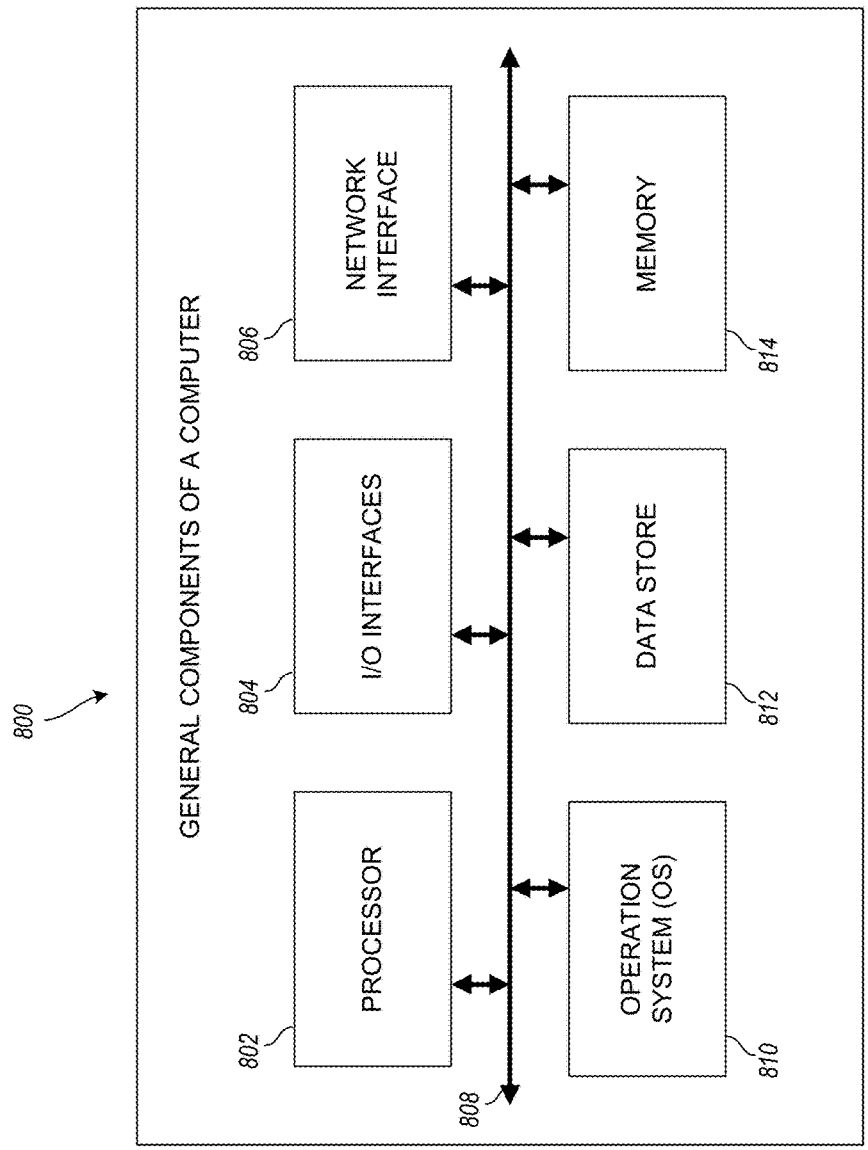
FIG. 8 is a block diagram illustrating the general components of a computer according to an exemplary embodiment of the technology.

Referring now to FIG. 8, a block diagram 800 illustrating the general components of a computer is shown. Any one or more of the computers, servers, databases, and the like, disclosed above, may be implemented with such hardware and software components. The computer 800 can be a digital/virtual computer that, in terms of hardware architecture, generally includes a processor 802, input/output (I/O) interfaces 804, network interfaces 806, an operating system (O/S) 410, a data store 812, and a memory 814. The components (802, 804, 806, 810, 812, and 814) are communicatively coupled via a local interface 808. The local interface 808 can be, for example but not limited to, one or more buses or other wired or wireless connections, as is known in the art. The local interface 808 can have additional elements, which are omitted for simplicity, such as controllers, buffers (caches), drivers, among many others, to enable communications. Further, the local interface 808 can include address, control, and/or data connections to enable appropriate communications among the aforementioned components. The general operation of a computer comprising these elements is well known in the art. In at least one embodiment, one or more aspects of the method are hosted in the network cloud, in one or more of a cloud computing model, nanotechnology model, or biotechnology model.

The processor 802 is a hardware device for executing software instructions. The processor 802 can be any custom made or commercially available processor, a central processing unit (CPU), an auxiliary processor among several processors associated with the computer 800, a semiconductor-based microprocessor (in the form of a microchip or chip set), or generally any device for executing software instructions. When the computer 800 is in operation, the processor 802 is configured to execute software stored within the memory 814, to communicate data to and from the memory 814, and to generally control operations of the computer 800 pursuant to the software instructions.

The I/O interfaces 804 can be used to receive user input from and/or for providing system output to one or more devices or components. User input can be provided via, for example, a keyboard and/or a mouse. System output can be provided via a display device and a printer (not shown). I/O interfaces 804 can include, for example but not limited to, a serial port, a parallel port, a small computer system interface (SCSI), an infrared (IR) interface, a radio frequency (RF) interface, and/or a universal serial bus (USB) interface.

The network interfaces 806 can be used to enable the computer 800 to communicate on a network. For example, the computer 800 can utilize the network interfaces 808 to communicate via the internet to other computers or servers for software updates, technical support, etc. The network interfaces 808 can include, for example, an Ethernet card (e.g., 10BaseT, Fast Ethernet, Gigabit Ethernet) or a wireless local area network (WLAN) card (e.g., 802.11a/b/g). The network interfaces 808 can include address, control, and/or data connections to enable appropriate communications on the network.

A data store 812 can be used to store data, such as information regarding positions entered in a requisition. The data store 812 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 812 can incorporate electronic, magnetic, optical, and/or other types of storage media. In one example, the data store 812 can be located internal to the computer 800 such as, for example, an internal hard drive connected to the local interface 808 in the computer 800. Additionally in another embodiment, the data store can be located external to the computer 800 such as, for example, an external hard drive connected to the I/O interfaces 804 (e.g., SCSI or USB connection). Finally in a third embodiment, the data store may be connected to the computer 800 through a network, such as, for example, a network attached file server.

The memory 814 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 814 may incorporate electronic, magnetic, optical, and/or other types of storage media. Note that the memory 814 can have a distributed architecture, where various components are situated remotely from one another, but can be accessed by the processor 802.

The software in memory 814 can include one or more software programs, each of which includes an ordered listing of executable instructions for implementing logical functions. The operating system 810 essentially controls the execution of other computer programs, such as the interactive toolkit for sourcing valuation, and provides scheduling, input-output control, file and data management, memory management, and communication control and related services. The operating system 810 can be any of Windows Server, Windows Azure, Windows NT, Windows 2000, Windows XP, Windows Vista, Windows 7, Windows 8 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), SendGrid, Amazon, or other like operating system with similar functionality.

In an exemplary embodiment of the technology described herein, one or more computers 800 are configured to perform one or more elements of flowcharts 200, 300, 400, 500, 600, depicted in FIGS. 2, 3, 4, 5, and 6, respectively.

Advantageously, the personalized digital/virtual gift products, systems, and associated methods described herein provide significant benefits to individual participants, such as central registration for networking contacts, turning encounters with customers and referral partners into new business, adds financial value of improved networking contacts and connections, creates a unique business/gift card (the digital/virtual gift product) that leaves a lasting impression upon the recipient, increases the probability of follow-up meetings, and encourages the card givers most highly valued contacts who receive the unique business/gift cards.

Advantageously, the personalized digital/virtual gift products, systems, and associated methods described herein provide significant benefits to merchants such as no-waste advertising cost, no-cost gift card production, costs incurred only when revenues are realized, provides aided card management, obtains data on giver (card buyer) and recipient (card user), and mobile application GPS for aid in locating a particular merchant store location. Additionally, the personalized digital/virtual gift products, systems, and associated methods described herein allow for targeted marketing with composite information available. Additionally, the personalized digital/virtual gift products, systems, and associated methods described herein allow for use of behavioral data.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A service provider computer server system for delivering a customizable, personalized, digital/virtual gift product and for generation and customization by a giver through the service provider and for receipt by a recipient for use with a merchant, who is not the service provider, the service provider computer server system comprising:
   one or more databases;
   one or more processors communicatively coupled to the one or more databases;
   one or more communication devices communicatively coupling the one or more processors with a first computing device of a giver, a second computing device of a receiver, and a third computing device of or for a merchant, who is not the service provider;
   one or more memory device communicatively coupled to the one or more processors and storing processor-executable instructions which, when executed by at least one of the one or more processors, cause the service provider computer server system to:
      provide an interface to the giver, a service provider site, of which the giver is a member, through which to add the recipient, or select a previously added recipient, intended to receive the digital/virtual gift product;
      receive, from the giver, a name, a mobile telephone number, and/or an e-mail address for a prospective recipient;
      provide the interface to the giver to select a merchant, who is not the service provider, through which merchant the digital/virtual gift product is redeemable by the recipient;
      personalize the digital/virtual gift product by creating a personal message to the recipient and allow the giver to attach one or more files of various types to the digital/virtual gift product;
      provide the interface to the giver to select a monetary gift value amount, by the giver, and depict the amount on the digital/virtual gift product for use and redemption with the preselected merchant; and
      forward, electronically by the service provider computer server system, the giver to a site for the merchant, whereby the giver completes a financial transaction to purchase the digital/virtual gift product or, remaining on the service provider's web site or within the service provider's application on a mobile device for completing a financial transaction;
      create the digital/virtual gift product generated and customized by the giver and having the monetary gift value selected by the giver for use and redemption with the preselected merchant, who is not the service provider, the digital/virtual gift product comprising:
         a representation of a monetary gift value selected by the giver and depicted on the digital/virtual gift product for use and redemption with a preselected merchant, who is not the service provider;
         a merchant identification depicted on the digital/virtual gift product to identify the preselected merchant, selected by the giver, and at which preselected merchant the digital/virtual gift product is redeemable; and
         a giver identification depicted on the digital/virtual gift product itself, having to identify the giver of the digital/virtual gift product to the recipient and to the merchant, wherein the giver identification comprises one of a photo and/or company logo and a name, a title, a phone number, and an e-mail address of the giver for view by the recipient and the merchant, thereby specifically adapted to improve network and referral generation and contacts for business executives, owners, independent contractors, sales representatives family, and networkers;
      maintain, by the service provider computer server system, an account list for the giver to include all prior recipients, recipient data, and digital/virtual gift products, thereby to enable the merchant, who is not the service provider, to have access to the giver's and the recipient's market data, product purchases, cost of goods sold, visit frequency, and buying habits and psychology for offering new marketing opportunities;
      maintain, by the service provider computer server system, a plurality of data on a relationship between the giver, the recipient, and the digital/virtual gift product;
      provide access to the merchant of the giver's market data, product purchases, cost of goods sold, visit frequency, and buying habits and psychology and behavioral data for targeted marketing;
      provide access to the merchant of the recipient's market data, product purchases, cost of goods sold, visit frequency, and buying habits and psychology and behavioral data for targeted marketing;

provide the interface to the giver to review balances on cards in his or her account list and a means to update and add value to the digital/virtual gift products;

provide the interface to the recipient to review balances on cards in his or her possession for future use;

inform the giver that a trigger alert value set by the giver was reached, to indicate that a card balance on a card gifted was reduced to an amount lower than the trigger alert value.

2. The service provider computer server system of claim 1, wherein the digital/virtual gift product further comprises:
a customized message provided by the giver to the service provider for depiction on the digital/virtual gift product and to personalize and customize the digital/virtual gift product.

3. The service provider computer server system of claim 1, wherein the digital/virtual gift product further comprises:
a matrix barcode or identifying marker depicted on the digital/virtual gift product and adapted to provide the recipient additional information on the merchant.

4. The service provider computer server system of claim 1, wherein the digital/virtual gift product further comprises:
a matrix barcode depicted on the digital/virtual gift product and adapted to provide the recipient additional information on the giver.

5. The service provider computer server system of claim 1, wherein the digital/virtual gift product further comprises:
a textual card number generated by the service provider and adapted to identify the digital/virtual gift product.

6. The service provider computer server system of claim 1, wherein the giver identification of the digital/virtual gift product further comprises a photographic image of the giver depicted on the digital/virtual gift product for view by the recipient and the merchant.

7. The service provider computer server system of claim 1, wherein the giver identification of the digital/virtual gift product for a person further comprises a name, a title, a phone number, and an e-mail address of the giver for view by the recipient and the merchant, and wherein the giver identification for a business entity further comprises a company name, address, phone number, and web site of the giver for view by the recipient and the merchant.

8. The service provider computer server system of claim 1, wherein the merchant identification of the digital/virtual gift product further comprises a merchant name and/or logo representative of the merchant at which merchant the digital/virtual gift product is redeemable.

9. The service provider computer server system of claim 1, wherein the merchant identification of the digital/virtual gift product further comprises a merchant name and a merchant location of the merchant at which merchant the digital/virtual gift product is redeemable.

10. A method to generate and customize a digital/virtual gift product, for generation and customization by a giver through a service provider and for receipt by a recipient for use with a merchant, who is not the service provider, the method comprising:
utilizing a service provider computer server system comprising:
one or more databases;
or more processors communicatively coupled to the one or more databases;
one or more communication devices communicatively coupling the one or more processors with a first computing device of a giver, a second computing device of a receiver, and a third computing device of a merchant, who is not the service provider;
one or more memory device communicatively coupled to the one or more processors and storing processor-executable instructions which, when executed by at least one of the one or more processors, cause the service provider computer server system to perform these steps:
providing an interface to the giver to a service provider site;
receiving from the giver, one of a photo and/or company logo and a name, a mobile telephone number, and/or an e-mail address for a prospective recipient, to be depicted on the digital/virtual gift product itself, thereby specifically adapted to improve effectiveness and referral generation for business executives, owners, independent contractors, sales representatives, and networkers;
accessing, by the giver, the service provider site, of which the giver is a member, through which to add the recipient, or select a previously added recipient, intended to receive the digital/virtual gift product;
selecting, by the giver, through the interface to the service provider site a merchant through which merchant the digital/virtual gift product is redeemable by the recipient;
personalizing, by the giver, through the interface to the service provider site the digital/virtual gift product by creating a personal message and allowing for attaching other files which add personalization components to the recipient;
selecting a monetary gift value amount, by the giver, through the interface to the service provider site and depicting the amount on the digital/virtual gift product for use and redemption with the preselected merchant; and
forwarding, electronically by the service provider, the giver to a site for the merchant, whereby the giver completes a financial transaction to purchase the digital/virtual gift product, or, remaining on the service provider's web site or within the service provider's application on a mobile device for completing a financial transaction;
create the digital/virtual gift product generated and customized by the giver and having the monetary gift value selected by the giver for use and redemption with the preselected merchant, who is not the service provider, the digital/virtual gift product comprising:
a representation of a monetary gift value selected by the giver and depicted on the digital/virtual gift product for use and redemption with a preselected merchant, who is not the service provider;
a merchant identification depicted on the digital/virtual gift product to identify the preselected merchant, selected by the giver, and at which preselected merchant the digital/virtual gift product is redeemable; and
a giver identification depicted on the digital/virtual gift product itself, having to identify the giver of the digital/virtual gift product to the recipient and to the merchant, wherein the giver identification comprises one of a photo and/or company logo and a name, a title, a phone number, and an e-mail address of the giver for view by the recipient and the merchant, thereby specifically adapted to improve effectiveness and referral and contact generation for business executives, owners, independent contractors, sales representatives, family, and networkers;

maintaining, by the service provider computer server system, an account list for the giver to include all prior recipients, recipient data, and digital/virtual gift products, thereby to enable the merchant, who is not the service provider, to have access to the giver's and the recipient's market data, product purchases, cost of goods sold, visit frequency, and buying habits and psychology for offering new marketing opportunities;

maintaining, by the service provider computer server system, a plurality of data on a relationship between the giver, the recipient, and the digital/virtual gift product;

provide access to the merchant of the giver's market data, product purchases, cost of goods sold, visit frequency, and buying habits and psychology and behavioral data for targeted marketing;

provide access to the merchant of the recipient's market data, product purchases, cost of goods sold, visit frequency, and buying habits and psychology and behavioral data for targeted marketing;

providing the interface to the giver to review balances on cards in his or her account list and a means to update and add value to the digital/virtual gift products and a means for the recipient to view balances for future use; and informing the giver that a trigger alert value set by the giver was reached, to indicate that a card balance on a card gifted was reduced to an amount lower than the trigger alert value.

11. A computer readable storage medium encoded with programming for implementing a method to generate and customize a digital/virtual gift product, for generation and customization by a giver through a service provider and for receipt by a recipient for use with a merchant, who is not the service provider, the computer readable storage medium encoded with programming configured to:

receive from the giver, one of a photo and/or company logo and a name, a mobile telephone number, and/or an e-mail address for a prospective recipient, to be depicted on the digital/virtual gift product itself, thereby specifically adapted to improve effectiveness and referral generation for business executives, owners, independent contractors, sales representatives, and networkers;

provide access, by the giver, through the interface to a service provider site, of which the giver is a member, through which to add the recipient, or select a previously added recipient, intended to receive the digital/virtual gift product;

select, by the giver, through the interface a merchant, who is not the service provider, through which merchant the digital/virtual gift product is redeemable by the recipient;

personalize, by the giver, through the interface the digital/virtual gift product by creating a personal message and/or attach files which increase a personal connection to the recipient;

select a monetary gift value amount, by the giver, through the interface and depict the amount on the digital/virtual gift product for use and redemption with the preselected merchant; and forward, electronically by the service provider, the giver to a site for the merchant, whereby the giver completes a financial transaction to purchase the digital/virtual gift product or, remaining on the service provider's web site or within the service provider's application on a mobile device for completing a financial transaction;

create the digital/virtual gift product generated and customized by the giver and having the monetary gift value selected by the giver for use and redemption with the preselected merchant, who is not the service provider, the digital/virtual gift product comprising:

a representation of a monetary gift value selected by the giver and depicted on the digital/virtual gift product for use and redemption with a preselected merchant, who is not the service provider;

a merchant identification depicted on the digital/virtual gift product to identify the preselected merchant, selected by the giver, and at which preselected merchant the digital/virtual gift product is redeemable; and a giver identification depicted on the digital/virtual gift product itself, having to identify the giver of the digital/virtual gift product to the recipient and to the merchant, wherein the giver identification comprises one of a photo and/or company logo and a name, a title, a phone number, and/or an e-mail address of the giver for view by the recipient and the merchant, thereby specifically adapted to improve effectiveness and referral and contact generation for business executives, owners, independent contractors, sales representatives, family, and networkers;

maintain, by the service provider computer server system, an account list for the giver to include all prior recipients, recipient data, and digital/virtual gift products, thereby to enable the merchant, who is not the service provider, to have access to the giver's and the recipient's market data, product purchases, cost of goods sold, visit frequency, and buying habits and psychology for offering new marketing opportunities;

maintain, by the service provider computer server system, a plurality of data on a relationship between the giver, the recipient, and the digital/virtual gift product;

provide access to the merchant of the giver's market data, product purchases, cost of goods sold, visit frequency, and buying habits and psychology and behavioral data for targeted marketing;

provide access to the merchant of the recipient's market data, product purchases, cost of goods sold, visit frequency, and buying habits and psychology and behavioral data for targeted marketing;

provide the interface to the giver to review balances on cards in his or her account list and a means to update and add value to the digital/virtual gift products and a means for the recipience to review card balances for future use; and inform the giver that a trigger alert value set by the giver was reached, to indicate that a card balance on a card gifted was reduced to an amount lower than the trigger alert value.

* * * * *

UNITED STATES PATENT AND TRADEMARK OFFICE
CERTIFICATE OF CORRECTION

PATENT NO. : 9,830,627 B2
APPLICATION NO. : 13/907871
DATED : November 28, 2017
INVENTOR(S) : Clark Page 1 of 1

It is certified that error appears in the above-identified patent and that said Letters Patent is hereby corrected as shown below:

On the Title Page

At Item (72), Inventors:
At Line 2 insert the name --Les Adkins, Douglasville, GA (US)--

Signed and Sealed this
Tenth Day of March, 2020

Andrei Iancu
*Director of the United States Patent and Trademark Office*